MAGNETIC RECORDER AND REPRODUCER

Filed March 12, 1962

INVENTORS.
RICHARD E. MORLEY
ROBERT T. PEARSON
BY
Philip J McFarland
ATTORNEY

United States Patent Office 3,148,362
Patented Sept. 8, 1964

3,148,362

MAGNETIC RECORDER AND REPRODUCER

Robert T. Pearson, Beverly, and Richard E. Morley, Bedford, Mass., assignors to Laboratory for Electronics, Inc., Boston, Mass., a corporation of Delaware Filed Mar. 12, 1962, Ser. No. 178,852
3 Claims. (Cl. 340—174.1)

Figure 1:
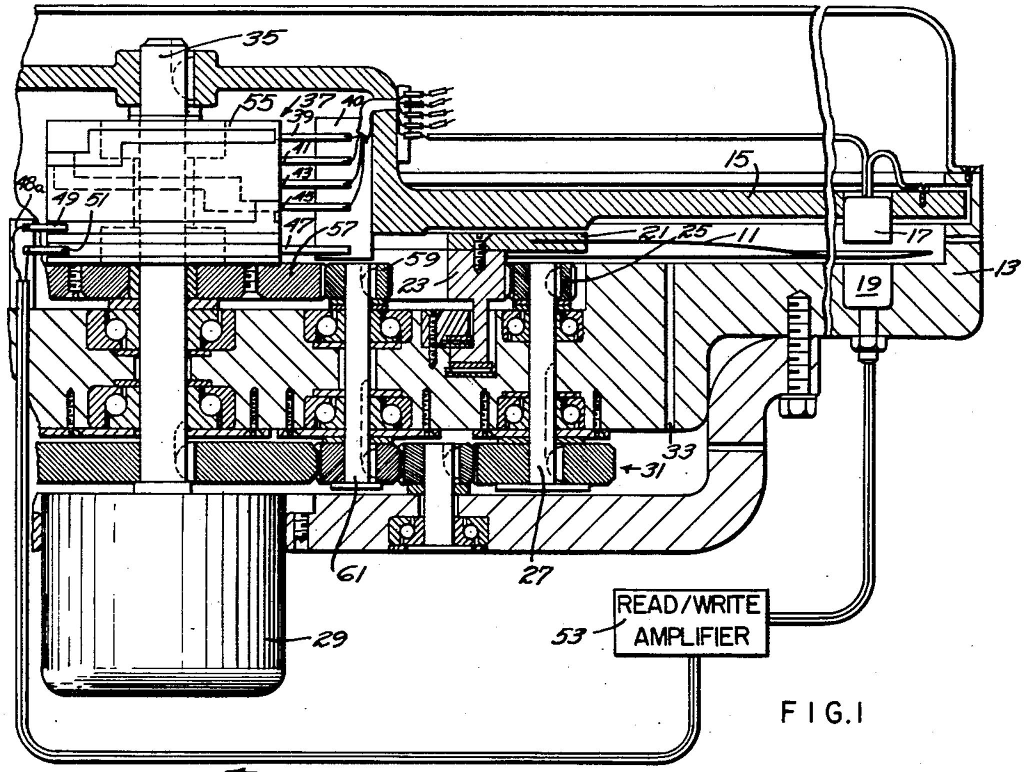

This invention pertains generally to data processing apparatus utilizing a magnetic storage medium and particularly to apparatus of such type that is adapted to recording information at a first rate and reading the recorded information at a different rate.

It is sometimes desirable to record information in a magnetic storage medium at a relatively slow rate of speed and, subsequently, to reach such information at a relatively high rate of speed. In the past, such slow recording and fast readout sometimes has been accomplished by changing the speed of the recording medium between the reading and the writing operation. Rather complicated and expensive mechanisms must, however, be used to attain satisfactory results. That is, proper control of the speed of the magnetic recording medium in a dual-speed recorder is attainable only with some sacrifice in simplicity and reliability. Further, if a dual-speed recorder is used to obtain the desired "slow-write, fast-read" processing of information (referred to hereinafter as "time compression"), a "dead" time exists between the writing and reading cycles, since any change in speed of the recording medium requires a finite period of time to accomplish. During the period in which the desired change in speed is being accomplished no useful information may be written on, or read from, the recording medium.

In other known types of recorders "slow-write fast-read" operation has been attained without changing the speed of the magnetic recording device. That is, it is known that magnetic transducers may be mounted on opposite sides of a thin magnetic recording medium and moved independently of each other to attain the difference in speed relative to the recording medium required for time compression. In known devices of the type just mentioned, it is, however, necessary that information be recorded serially on a single track. Such a limitation is of great import in a practical device in that single track recording is rather inefficient when a recording medium such as magnetic tape is to be used.

Therefore, it is an object of this invention to provide a multi-track magnetic recorder useful in time compression which does not require any change in speed of the recording medium to accomplish its desired purpose.

Another object of this invention is to provide a "non-contacting" magnetic recorder useful in time compression which may be operated continuously.

Still another object of this invention is to provide a a magnetic recorder which efficiently accomplishes the foregoing objects utilizing known components.

These and other objects of the invention are attained generally by providing a flexible disc recorder in which a thin disc of a magnetic recording material is rotated at a constant speed adjacent to a stabilizing plate to stabilize the disc's shape, then recording the desired signal with a movable writing head mounted and driven so as to move relatively slowly with respect to the thin disc in a plane spaced therefrom, and finally reading out any recorded signals with a reading head embedded in the stabilizing plate.

Figure 2:
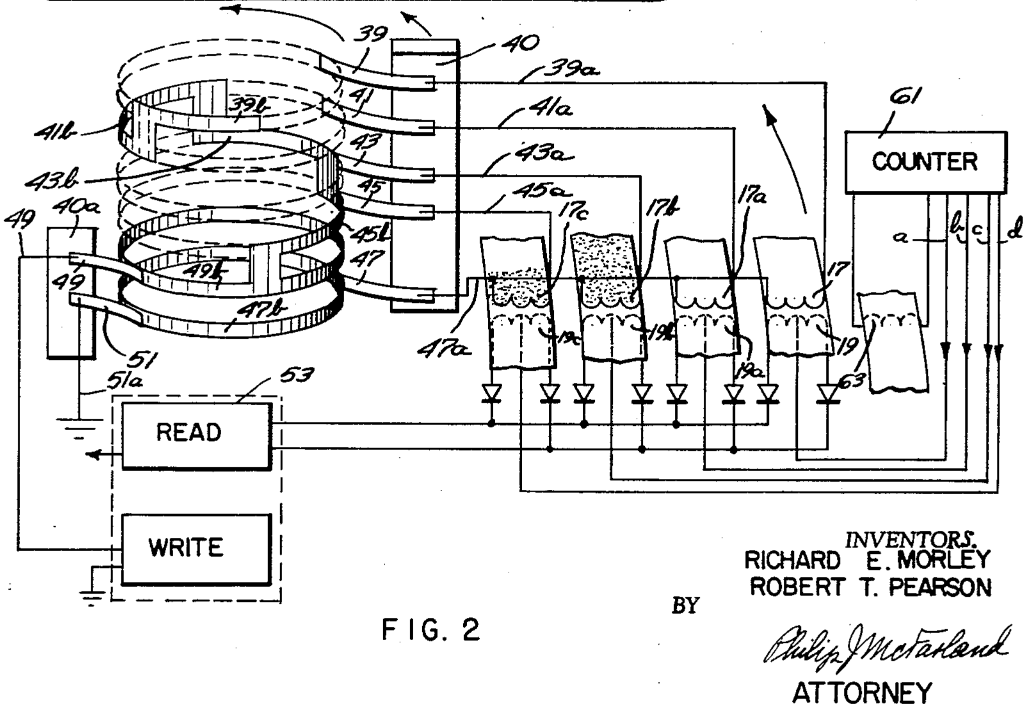

For a more complete understanding of the invention, reference is now made to the following detailed description of a preferred embodiment of the invention illustrated in the accompanying drawings in which:

FIG. 1 is a partial cross-section, somewhat distorted the better to illustrate important details, of a magnetic recorder according to the invention; and, FIG. 2 is an idealized and simplified illustration of the way in which a plurality of tracks may be formed in a magnetic recording medium to extend the time of recording and to show the mode of operation of the recorder illustrated in FIG. 1.

Referring now to FIG. 1, it may be seen that a preferred embodiment of the invention comprises a magnetic recording medium 11 rotatably mounted between a stabilizing plate 13 and a writing head support member 15. A writing head 17 is embedded in the writing head support member 15 and a reading head 19 is embedded in the stabilizing plate 13 at the same radial distance from the axis of rotation of the magnetic recording medium 11 as the writing head 17.

It should be understood, however, that three other writing heads 17*a*, 17*b*, 17*c* and three other reading heads 19*a*, 19*b*, 19*c* and a timing head 19*d* are supported at different points around respectively, the writing head support member 15 and the stabilizing plate 13. It should also be understood that the magnetic recording medium 11 preferably is shaped as an annular disc of a flexible magnetic recording material, as for example, comminuted iron oxide bonded to a thin base of a non-magnetic thermoplastic material. The term "flexible" here is used in the sense that the medium is so thin with respect to its diameter that it may be incorporated in a flexible disc recorder of the type described in more detail in the copending application, Serial No. 97,987 of R. T. Pearson and W. J. Gorman entitled Data Processing, filed March 21, 1961, and assigned to the same assignee as this application. Such a flexible medium is, of necessity, so thin that writing may be done from one side and reading from the opposite side.

The magnetic recording medium 11 is clamped in an annular disc 21, which element in turn is attached as by a plurality of screws of which only one is here shown, to an outer ring gear 23 restrained in a channel (not numbered) formed in the stabilizing plate 13. The outer ring gear 23 is meshed with a first driving gear 25 which in turn is driven by a first gear shaft 27, through a gear assembly 31, by an electric motor 29. Thus, when the electric motor 29 is energized by an appropriate source (not shown), the magnetic recording medium 11 is caused to rotate and draw air through an aperture 33 in the stabilizing plate 13 to set up the required fluid forces on the magnetic recording medium 11 to stabilize such medium at a small distance, say .001", from the stabilizing plate 13 in the manner described in detail in the cited application.

The writing head support 15 is keyed directly to the rotor shaft 35 of the electric motor 29. The writing head 17, therefore, may be caused to be rotated in the same direction as the magnetic recording medium 11 when the electric motor 29 is energized. The speed of rotation of the writing head 17, however, differs from the speed of rotation of the magnetic recording medium 11 for reasons explained hereinafter.

Since the writing head 17 is rotated, and since it is desired to control the length of track recorded on the magnetic recording medium 11, the writing head must be energized through a commutator such as the illustrated brush assembly 37. In the illustrated case, the brush assembly 37 consists of a plurality of brushes 39, 41, 43, 45, 47, 49, 51, mounted on insulating blocks 40, 40*a* attached respectively to the writing head support member 15 and the stablizing plate 13. Leads 39*a*, 41*a*, 43*a*, 45*a*, 47*a*, and 49*a* and 51*a* (more clearly shown in FIG. 2) are connected between each of the brushes 39 through 51 to connect each writing head 17 (again as shown in FIG. 2) in parallel with the write output terminals of a read/write amplifier 53. The free end of each one of the brushes 39 through 51 bears springily, as shown, against individual conductive sectors 39*b*, 41*b*, 43*b*, and 45*b* supported on a drum 55 which is caused to rotate at a speed intermediate of the speed of the writing head 17 and the magnetic recording medium 11. The desired mechanical movement of the drum 55 is attained by driving an inner ring gear 57, affixed to the drum 55 (as by a plurality of screws (not numbered), two of which are shown in FIG. 1) with a second driving gear 59, which latter element in turn is keyed to a second gear shaft 61 meshing with the gear assembly 31. Thus, since the drum 55 and the inner ring gear 57 are rotatably mounted on the rotor shaft 35, the drum 55 may be rotated independently of, but in the same direction as, the writing head support member 15, and the brushes 39, 41, 43 and 45 and the conductive sectors 39*b*, 41*b*, 43*b* and 45*b* may move relative to each other to energize each writing head 17, 17*a*, 17*b* and 17*c* sequentially. Obviously, however, it will be desirable to provide overlap between successive conductive sectors 39*b*, 41*b*, 43*b* and 45*c* to prevent dropout of information. To accomplish this end, the length of each conductive sector 39*b*, 41*b*, 43*b* and 45*b* may be each extended a few degrees beyond 90°. For purposes of explanation, however, it is simpler if the individual sectors in the illustrated example each be assumed to be exactly 90° in length.

The manner in which writing is accomplished by the just-described structure may be best understood by referring to FIG. 2 and by assuming certain operating conditions. Thus, if it be assumed that the electric motor 29 and the gear assembly 31 are so selected that: (*a*) the magnetic recording medium 11 may be rotated at a speed of 3600 r.p.m.; (*b*) the writing head support member 15 (and the writing heads 17, 17*a*, 17*b* and 17*c* supported thereby) may be rotated at a speed of 3564 r.p.m.; and, (*c*) the drum 55 (and the commutator sectors thereon) may be rotated at a speed of 3576 r.p.m., then explanation of the writing mode of operation of the illustrated apparatus may be simplified. Under such conditions one may consider that the writing head support member 15 (and the writing heads 17, 17*a*, 17*b* and 17*c* supported thereby) is stationary and that the drum 55 and the magnetic recording medium 11 are, with respect to the writing heads 17, 17*a*, 17*b*, 17*c* moving, respectively, at speeds of 12 and 36 r.p.m.

Under the assumed conditions, during the time taken for any particular conductive sector 39*b*, 41*b*, 43*b*, 45*b* to move through an angle of 90 degrees, the magnetic recording medium 11 will move through an angle of 270 degrees. Since there are, in the illustrated embodiment, 4 conductive sectors each 90 degrees in length, it follows that the magnetic recording medium 11 must rotate between 3 complete turns during the time taken for all the conductive sectors to move past its associated brush. Since the magnetic recording medium 11 moves at a speed of 36 r.p.m. relative to the writing heads 17, 17*a*, 17*b*, 17*c* it follows then that one complete recording cycle is accomplished in 5 seconds.

Since, in the present case, the magnetic recording medium 11 is moving at a speed of 3600 r.p.m. with respect to the reading heads 19, 19*a*, 19*b*, 19*c*, the information carried by such medium may be read serially in the time taken to make three complete revolutions, or 3/60 seconds. It should be noted, however, that if, in addition to serial readout, it is also required to read the information in the order in which it was recorded up to four complete revolutions of the magnetic recording medium 11 could be initially required.

As the magnetic recording medium 11 moves past the reading heads 19, 19*a*, 19*b*, 19*c* each such head is energized in accordance with the magnetization imparted to the magnetic recording medium 11 by its corresponding writing head 17, 17*a*, 17*b*, 17*c*. Since, however, the reading heads 19, 19*a*, 19*b*, 19*c* are of the split coil type and each is connected to the read amplifier 53 through blocking diodes as shown in FIG. 2, the signal from only one reading head may pass to the reading amplifier 53 since a counter 61 generates an enabling signal for only one reading head at a time. The counter 61 may take any one of many known forms and since its detailed construction is not essential to a complete understanding of the invention it will not be described in detail. It is sufficient only that the counter 61 be adapted to receive a pulse input from a timing head 63 energized by timing marks on magnetic recording medium 11 in any known manner so as to correspond with the switching from conductive sector to conductive sector in the brush assembly 37 during the recording process and then to shift the enabling signal output consecutively to the leads marked *a*, *b*, *c* and *d* after three pulses have been received. As a result then the information recorded on the magnetic recording medium 11 is read out sequentially. It is of course, well known in the art to impress a distinguishing mark on the magnetic storage medium 11 to signify the beginning of recording if such a point is significant in a given application.

Having described a preferred embodiment of the invention and shown the manner in which such embodiment attains the stated purposes of the invention, it may be seen that many obvious changes may be made without departing from the inventive concepts. For example, the conducting sectors of the brush assembly could very easily be modified so that, during recording, distinctive marks could be impressed on the magnetic recording medium by the writing heads to signify shift from track to track so that the reading heads themselves could be used to generate enabling signals to allow serial readout. Further, the overall mechanical layout, including the number of reading and writing heads and the speed of operation (or amount of time compression) may be changed within wide limits. It is felt, therefore, that the invention should not be limited to its illustrated and described embodiment but rather by the spirit and scope of the appended claims.

What is claimed is:

1. A magnetic recorder in which data may be serially recorded on a plurality of tracks at a first speed and read out serially at a second speed, comprising:

(*a*) a flexible disc magnetic recording medium;

(*b*) means for rotating such recording medium at a first constant speed;

(*c*) a plurality of recording heads spaced at different radial points adjacent to a first surface of such recording medium;

(*d*) means for rotating the recording heads at a second constant speed in the same direction as such recording medium;

(*e*) means, including a brush assembly having a like plurality of sectors, each sector equal to 360°/*n*, where *n* equals the number of recording heads, for sequentially energizing each recording head;

(*f*) means for rotating the brush assembly at a third speed in the same direction as such recording medium; and (g) means, including a like plurality of stationary reading heads adjacent to the second side of such recording medium, for sequentially reading out information written in such recording medium by each recording head.

2. A magnetic recorder as in claim 1 wherein the third speed is higher than the second speed so that the tracks recorded by each recording head overlap.

3. A magnetic recorder as in claim 2 wherein the means for sequentially reading out information written in the flexible disc magnetic recording medium includes:

(a) means for detecting the beginning of the recorded information; and, (b) means for detecting the end of each recorded track and energizing the reading head adjacent to the next recorded track.

No references cited.